March 21, 1939.   G. H. HAMILL   2,151,270
PLOW
Filed Aug. 19, 1936   2 Sheets-Sheet 2

G. H. Hamill
INVENTOR.
BY Van Buren Hillyard.
ATTORNEY.

Patented Mar. 21, 1939

2,151,270

UNITED STATES PATENT OFFICE 2,151,270

PLOW

George H. Hamill, Grandfield, Okla.

Application August 19, 1936, Serial No. 96,869

4 Claims. (Cl. 97—47)

The invention relates to earth tilling machinery generally operating in multiple and mounted upon wheels.

The invention provides a unique arrangement whereby a gang of plows, listers, and analogous implements, may be short coupled to a tractor whereby to till the soil to within a very short distance of the end of the row and which is not possible where the plows are drawn as trailers in the manner generally practiced.

A further purpose of the invention is the provision of an implement as a whole in which the plows are in multiple and close to the tractor and in which the side plows are beyond the ground wheels of the tractor and capable of adjustment with the intermediate plows and by the same control mechanism dispensing with additional control or extra means to effect the required work.

While the drawings illustrate a preferred embodiment of the invention it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which.

Corresponding and like parts are designated in both views of the drawings by the same reference characters.

Figure 1:
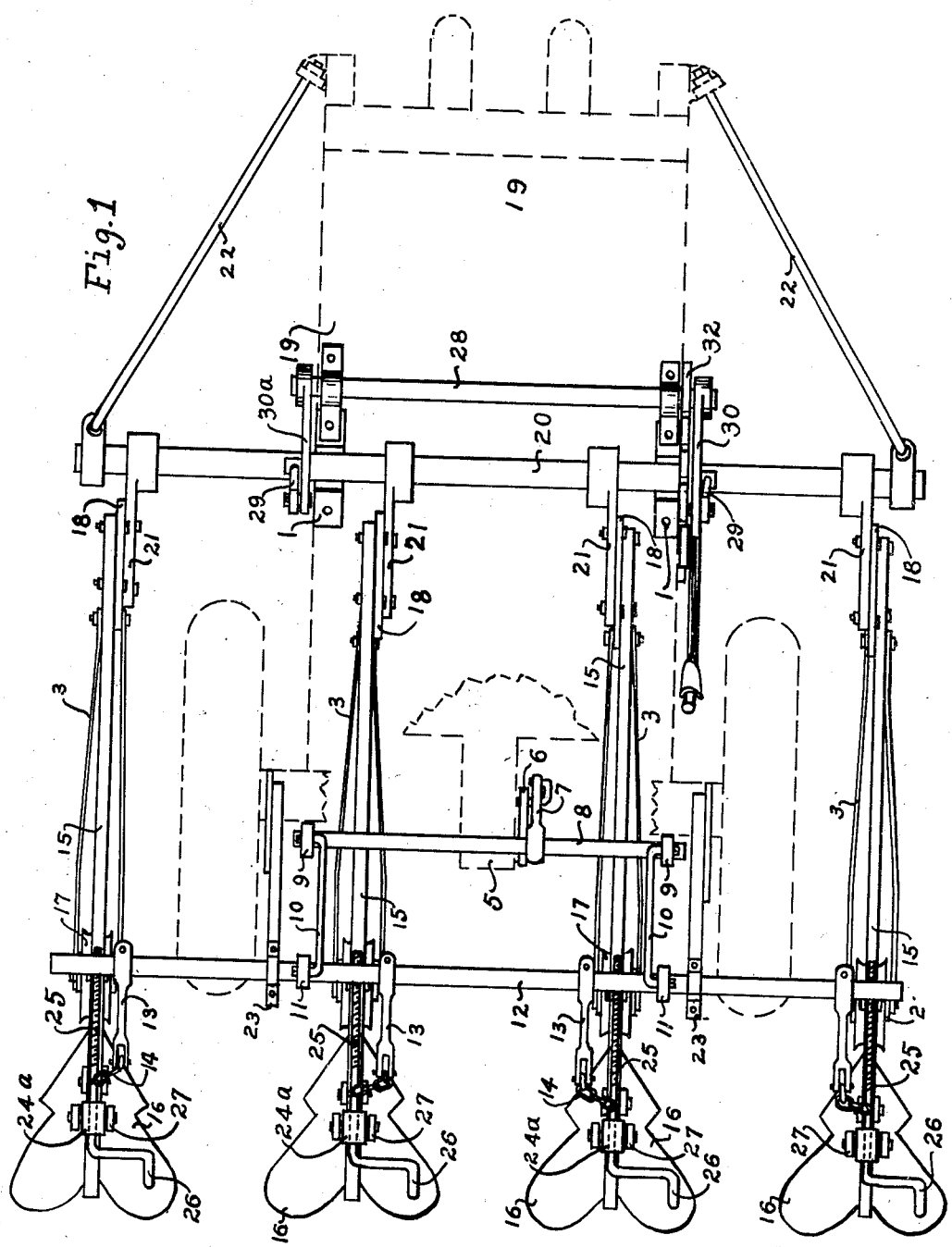
Figure 1 is a top plan view of a multiple plow embodying the invention, the dotted lines showing a tractor to which the plows are coupled.
Figure 2:
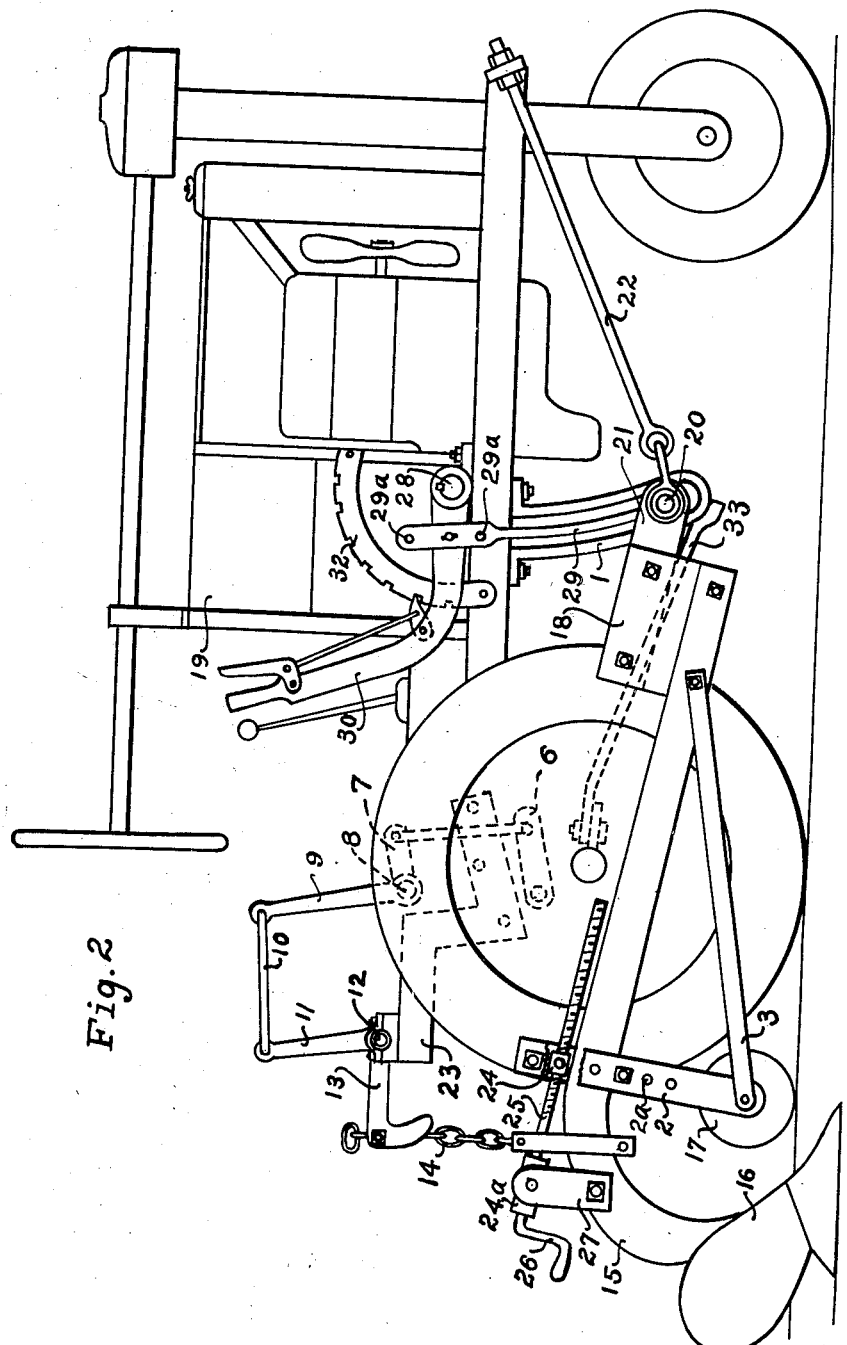
Figure 2 is a side view of the parts depicted in Figure 1, in the same relation.

The numeral 19 indicates a tractor of approved type as generally employed for drawing field machinery over the ground for tilling the soil, planting, harvesting and the like. Standards 1 are connected with the frame of the tractor and support a cross bar 20, the outer ends of which are connected by braces 22 with the forward portion of the tractor frame. A plurality of arms 21 are mounted upon the cross bar 20 and extend rearwardly therefrom and support plates 18 which are attached thereto. Beams 15 are connected to the plates 18 and receive shovels 16 of a type to perform the required work for tilling, cultivating, or the like. Standards 2 are adjustably connected with the rear portion of the beams and receive wheels 17 at their lower ends. Braces 3 are interposed between the lower ends of the standards 2 and the forward ends of the beams 15 and are connected to the ends of the axles upon which the wheels 17 are mounted. Brackets 23 are connected to the frame of the tractor and extend rearwardly and support a cross bar 12. Arms 13, fast to the cross bar 12, extend rearwardly and terminate in arcuate elements which engage chains 14 or other flexible connections attached to and supporting the beams 15. When the cross bar 12 is rocked the arms 13 pivot and raise or lower the beams 15 and the shovels 16 about the axis of the cross bar 20. Other arms 11 extend upwardly from the cross bar 12 and are connected by links 10 with arms 9 projected from a cross shaft 8 which is suitably mounted on the tractor and operable through arm 7 in a well known manner by a conventional control 6.

The wheels 17 gage the depth of the shovels and the latter may be raised or lowered by rocking the shaft 8. Suitable means may be provided for holding the shovels 16 at the desired adjusted position. The cross members 12 and 20 may be of any length to accommodate any desired number of plows, cultivators, or earth treating devices 15—16, within the capacity of the machine.

The standards 1 are of arcuate form to permit the adjusting of the front end of the beams 15 while braces 22 are still connected to cross member 20. A brace 33 is secured to standard 1. The adjustment of the front ends of the beams is accomplished through the manipulation of lever 39. Links 29 on either side of tractor connect cross member 20 with levers 30 and 30$^a$ which are connected together by a shaft 28. Additional adjusting holes 29$^a$ are provided in links 29 for adjustments that ratchet segment 32 do not afford. By these adjustments of the front end of beam 15 a plow may be set to give better performance than by adjusting the same from the rear completely.

A depth gaging control is minutely adjustable through the use of both the adjustment holes 2$^a$ in the standard 2 and screw member 25. By the manipulation of screw 25 standard 2 is moved along the beam 15 permitting gage wheel 17 to swing within an arc defined by brace 3, thus allowing an adjustment usually equal to one hole 2$^a$ on the standard. It may readily be seen with the combination a full range of adjustment may be had. Screw 25 is provided with a crank 26 for convenience of rotation. Straps 27 are secured to beams 15 and pivotally mount block 24$^a$, in which the screws 25 are rotatably secured. A second block 24 is pivoted in standards 2, and threadably engages screw 25.

It is observed that plows or cultivator members are located between and exterior of the ground wheels of the tractor and are adjustable to exacting accuracy by the controls.

It is furthermore to be noted that the plows exterior of the tractor are so positioned and arranged as to work in unitary accord with plows between the wheels, as they are mounted on unitary systems.

Having thus described the invention, what I claim is:

1. A multiple plow, cultivator or the like comprising front and rear cross members, beams pivotally mounted upon the front cross member, connecting means between the rear cross member and beams, shovel blades carried by the beams, means for turning the rear cross member to raise and lower the shovel blades, arcuate guides receiving the front cross member, control means for adjusting the front cross member along the guides to adjust front ends of beams, and bracing means for said front cross member and connected with opposite ends thereof and permitting upward arcuate movement thereof in the guides.

2. A multiple plow, cultivator or the like comprising front and rear cross members, beams pivotally mounted upon the front cross member, a depth gauge wheel for each beam, a connection between said wheel and beam, connecting means between the rear cross member and beams, shovel blades carried by the beams, means for turning the rear cross member to raise and lower the shovel blades, and screw control means extending lengthwise of each beam and having screw-threaded connection with the wheel connection for adjusting each depth gage wheel.

3. In a plow implement, the combination of a plow beam, a gauge wheel therefor, a support for said wheel connected therewith and slidably and loosely connected with the plow beam, and a screw having threaded connection with said support for positively moving said support lengthwise of said plow beam to vary the gauge wheel relative thereto.

4. In a multiple plow implement, the combination of a supporting structure, guides extending downwardly from said supporting structure at opposite sides thereof, a cross-member mounted in said guides for upward movement therein, plow beams pivoted on said cross-member, links attached to opposite end portions of the cross-member for adjusting the same in the guides, and braces connected with the opposite end portions of the cross-member and extending forwardly to the front portion of the supporting structure.

GEORGE H. HAMILL.